United States Patent
Zimmerman, II et al.

(10) Patent No.: US 11,975,634 B2
(45) Date of Patent: May 7, 2024

(54) SEAT ASSEMBLY FOR USE IN AN AUTOMOTIVE VEHICLE FOR MOVEMENT BETWEEN A PLURALITY OF POSITIONS

(71) Applicants: Magna Seating Inc., Aurora (CA); Ronald Zimmerman, II, White Lake, MI (US); Cheikh Dioum, Farmington Hills, MI (US)

(72) Inventors: Ronald Zimmerman, II, White Lake, MI (US); Cheikh Dioum, Farmington Hills, MI (US)

(73) Assignee: Magna Seating Inc., Aurora (CA)

( * ) Notice: Subject to any disclaimer, the term of this patent is extended or adjusted under 35 U.S.C. 154(b) by 422 days.

(21) Appl. No.: 17/416,805

(22) PCT Filed: Dec. 19, 2019

(86) PCT No.: PCT/US2019/067306
§ 371 (c)(1),
(2) Date: Jun. 21, 2021

(87) PCT Pub. No.: WO2020/132153
PCT Pub. Date: Jun. 25, 2020

(65) Prior Publication Data
US 2022/0072977 A1 Mar. 10, 2022

Related U.S. Application Data

(60) Provisional application No. 62/794,034, filed on Jan. 18, 2019, provisional application No. 62/781,649, filed on Dec. 19, 2018.

(51) Int. Cl.
*B60N 2/12* (2006.01)
*B60N 2/04* (2006.01)
(Continued)

(52) U.S. Cl.
CPC ............... *B60N 2/12* (2013.01); *B60N 2/045* (2013.01); *B60N 2/1615* (2013.01); *B60N 2/20* (2013.01); *B60N 2/309* (2013.01)

(58) Field of Classification Search
CPC ........ B60N 2/12; B60N 2/045; B60N 2/1615; B60N 2/20; B60N 2/309; B60N 2/02;
(Continued)

(56) References Cited

U.S. PATENT DOCUMENTS 4,986,591 A * 1/1991 Martienssen .......... B60N 2/045
296/65.09
6,336,679 B1 * 1/2002 Smuk ..................... B60N 2/206
297/378.12
(Continued)

FOREIGN PATENT DOCUMENTS

CN 103380023 10/2013
CN 104619550 A * 5/2015 ........... B60N 2/0292
(Continued)

OTHER PUBLICATIONS

Li, "Seat installed in cab and vehicle", Published: Jun. 29, 2018, Publisher: Chinese Patent Office, Edition: CN-108215948-A (Year: 2018).*
(Continued)

*Primary Examiner* — Dennis H Pedder
(74) *Attorney, Agent, or Firm* — Miller Canfield

(57) ABSTRACT

A seat assembly includes a four-bar linkage for providing movement of the seat assembly between a plurality of positions in an automotive vehicle. The four-bar linkage includes front and rear links which simultaneously rotate to move the seat assembly between an easy entry position in which the seat assembly tilts forwardly and downwardly toward a floor of the automotive vehicle to allow ingress and egress behind the seat assembly, a stow position in which a
(Continued)

seat cushion lowers toward the floor of the automotive vehicle and a seat back pivots toward and overlaps the seat cushion, and an intermediate design position in which the seat cushion is spaced from the floor of the automotive vehicle and the seat back is disposed generally upright to support an occupant. The seat assembly is capable of moving directly between the easy entry and stow positions without needing to intermediately return to the design position.

60 Claims, 11 Drawing Sheets

(51) Int. Cl.
  *B60N 2/16* (2006.01)
  *B60N 2/20* (2006.01)
  *B60N 2/30* (2006.01)

(58) Field of Classification Search
  CPC . B60N 2/04; B60N 2/146; B60N 2/14; B60N 2/206; B60N 2/3047; B60N 2/305
  USPC .............. 296/63, 65.01, 65.05, 65.09, 65.13; 297/313, 314, 315, 316, 317, 378.1, 297/378.12, 378.14, 331, 334
  See application file for complete search history.

(56) References Cited

U.S. PATENT DOCUMENTS

| | | | | |
|---|---|---|---|---|
| 6,601,900 | B1 * | 8/2003 | Seibold | B60N 2/36 296/65.09 |
| 6,964,452 | B2 | 11/2005 | Kaemmerer | |
| 8,424,969 | B2 | 4/2013 | Kaemmerer | |
| 8,439,444 | B2 * | 5/2013 | Ngiau | B60N 2/12 297/331 |
| 8,602,495 | B2 * | 12/2013 | Jeong | B60N 2/3013 297/378.12 |
| 8,662,587 | B2 * | 3/2014 | Ngiau | B60N 2/12 297/344.21 |
| 2004/0239168 | A1 * | 12/2004 | Persad | B60N 2/22 297/378.1 |
| 2015/0037563 | A1 | 2/2015 | Bockmeyer et al. | |
| 2017/0001546 | A1 * | 1/2017 | Keyser | B60N 2/2227 |

FOREIGN PATENT DOCUMENTS

| | | | | |
|---|---|---|---|---|
| CN | 106314223 | | 1/2017 | |
| CN | 108215948 | | 6/2018 | |
| CN | 108215948 | A * | 6/2018 | B60N 2/22 |
| DE | 102006004497 | | 8/2007 | |
| DE | 102014205725 | | 6/2015 | |
| EP | 0985575 | | 3/2000 | |
| EP | 2571718 | | 3/2013 | |
| FR | 2917679 | | 12/2008 | |
| FR | 2969057 | | 6/2012 | |
| KR | 20090061795 | A * | 6/2009 | B60N 2/30 |
| KR | 20090086085 | A * | 8/2009 | B60N 2/20 |
| WO | 2008120415 | | 10/2008 | |
| WO | 2015128316 | | 9/2015 | |
| WO | 2017012990 | | 1/2017 | |
| WO | 2018046433 | | 3/2018 | |
| WO | 2018123155 | | 5/2018 | |

OTHER PUBLICATIONS

Lim Deok Soo, "Rear Seat Apparatus for Vehicle", Published: Jun. 17, 2009, Publisher: Korean Patent Office, Edition: KR20090061795A (Year: 2009).*

Hurst et al., "Fold Flat Seat Assembly With Rearward Folding Motion", Published: Aug. 10, 2009, Publisher: Korean Patent Office, Edition: KR20090086085A (Year: 2009).*

Kaemmerer, "Vehicle seat, in particular a motor vehicle seat", Published: May 13, 2015, Publisher: Chinese Patent Office, Edition: CN104619550 (Year: 2015).*

* cited by examiner

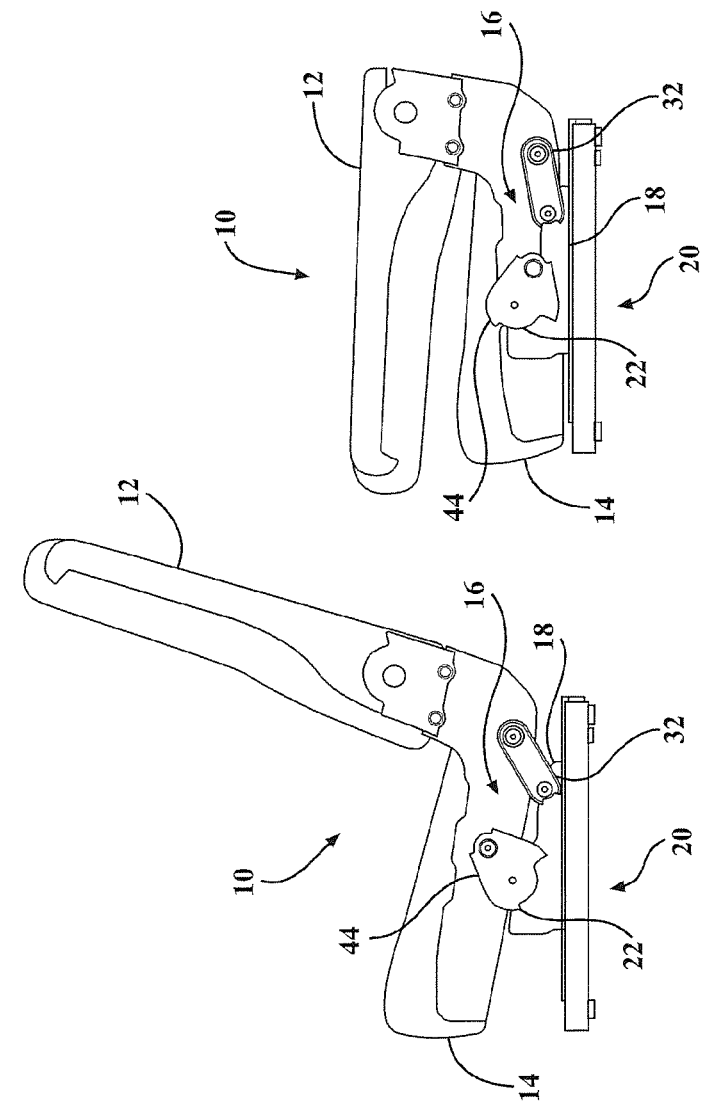
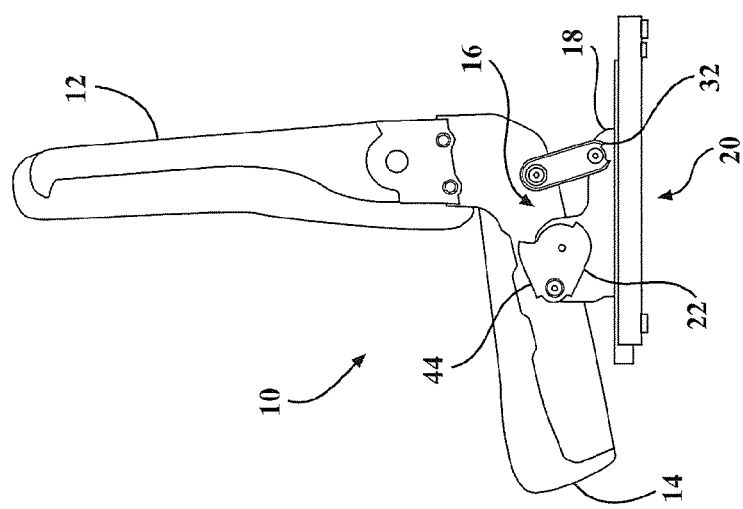
FIG. 1A  FIG. 1B  FIG. 1C ed on Dec. 19,

SEAT ASSEMBLY FOR USE IN AN AUTOMOTIVE VEHICLE FOR MOVEMENT BETWEEN A PLURALITY OF POSITIONS

CROSS-REFERENCE TO RELATED APPLICATIONS

This application claims priority to and all the benefits of U.S. Provisional Application 62/781,649, filed on Dec. 19, 2018, and U.S. Provisional Application 62/794,034, filed on Jan. 18, 2019, which are hereby incorporated by reference in their entirety.

BACKGROUND OF THE INVENTION

1. Field of the Invention

The present invention relates to a seat assembly for use in an automotive vehicle for movement between a plurality of positions.

2. Description of Related Art

Seat assemblies for use in an automotive vehicle for movement between a plurality of positions, such as a stow position, a design position, and an easy entry position, are known in the art. Typical seat assemblies include a seat cushion with a front portion and a rear portion for supporting an occupant in the automotive vehicle. A seat back is pivotally coupled to the seat cushion. A four-bar linkage for allowing movement of the seat cushion includes a front link extending longitudinally between a first end and an opposite second end, the first end rotatably coupled to the front portion of the seat cushion at a first pivot point, and the second end rotatably coupled at a second pivot point. The four-bar linkage also includes a rear link extending longitudinally between a first end and an opposite second end, the first end rotatably coupled to the rear portion of the seat cushion at a third pivot point, and the second end rotatably coupled at a fourth pivot point. The four-bar linkage is used to move the seat assembly between the design position and the stow position, or between the design position and the easy entry position. However, typical seat assemblies cannot move directly from the easy entry position to the stow position.

SUMMARY OF THE INVENTION

According to one aspect of the invention, a seat assembly adapted to be mounted to a floor of an automotive vehicle is provided for movement between a plurality of positions. The seat assembly includes a seat cushion having a front portion and a rear portion for supporting an occupant in the automotive vehicle. A seat back is pivotally coupled to the seat cushion. A four-bar linkage includes a front link extending longitudinally between a first end and an opposite second end, the first end rotatably coupled to the front portion of the seat cushion at a first pivot point, and the second end rotatably coupled at a second pivot point. The four-bar linkage also includes a rear link extending longitudinally between a first end and an opposite second end, the first end rotatably coupled to the rear portion of the seat cushion at a third pivot point, and the second end rotatably coupled at a fourth pivot point. The front and rear links are rotatable in a first direction for moving the seat assembly between a design position in which the seat cushion is spaced from the floor of the automotive vehicle and the seat back is disposed generally upright to support the occupant, and an easy entry position in which the seat assembly tilts forwardly and downwardly toward the floor of the automotive vehicle to allow ingress and egress behind the seat assembly. The front and rear links are also rotatable in a second direction opposite the first direction for moving the seat assembly between the design position and a stow position in which the seat cushion lowers toward the floor of the automotive vehicle and the seat back pivots toward and overlaps the seat cushion, and for moving the seat assembly between the easy entry position and the stow position.

According to a second aspect of the invention, a seat assembly adapted to be mounted to a floor of an automotive vehicle is provided for movement between a plurality of positions. The seat assembly includes a seat cushion having a front portion and a rear portion for supporting an occupant in the automotive vehicle. A seat back is pivotally coupled to the seat cushion. A four-bar linkage includes a front link extending longitudinally between a first end and an opposite second end, the first end rotatably coupled to the front portion of the seat cushion at a first pivot point, and the second end rotatably coupled at a second pivot point. The four-bar linkage also includes a rear link extending longitudinally between a first end and an opposite second end, the first end rotatably coupled to the rear portion of the seat cushion at a third pivot point, and the second end rotatably coupled at a fourth pivot point. The four-bar linkage rotates to move the seat assembly between an easy entry position in which the seat assembly tilts forwardly and downwardly toward the floor of the automotive vehicle to allow ingress and egress behind the seat assembly, a stow position in which the seat back pivots toward and overlaps the seat cushion and the seat cushion lowers toward the floor of the automotive vehicle such that the first pivot point is disposed below a line extending between the second pivot point and the third pivot point, and a design position intermediate the stow position and the easy entry position in which the seat cushion is spaced from the floor of the automotive vehicle and the seat back is disposed generally upright to support the occupant.

According to another aspect of the invention, a seat assembly adapted to be mounted to a floor of an automotive vehicle is provided for movement between a plurality of positions. The seat assembly includes a seat cushion having a front portion and a rear portion for supporting an occupant in the automotive vehicle. A seat back is pivotally coupled to the seat cushion. A four-bar linkage includes a front link extending longitudinally between a first end and an opposite second end, the first end rotatably coupled to the front portion of the seat cushion at a first pivot point, and the second end rotatably coupled at a second pivot point. The four-bar linkage also includes a rear link extending longitudinally between a first end and an opposite second end, the first end rotatably coupled to the rear portion of the seat cushion at a third pivot point, and the second end rotatably coupled at a fourth pivot point. The front and rear links are rotatable in a first direction for moving the seat assembly between a design position in which the seat cushion is spaced from the floor of the automotive vehicle and the seat back is disposed generally upright to support the occupant, and an easy entry position in which the seat assembly tilts forwardly and downwardly toward the floor of the automotive vehicle to allow ingress and egress behind the seat assembly. The front and rear links are also further rotatable in the first direction for moving the seat assembly between the easy entry position and a stow position in which the seat cushion lowers toward the floor of the automotive vehicle and the seat back pivots toward and overlaps the seat cushion.

According to yet another aspect of the invention, a seat assembly adapted to be mounted to a floor of an automotive vehicle is provided for movement between a plurality of positions. The seat assembly includes a seat cushion having a front portion and a rear portion for supporting an occupant in the automotive vehicle. A seat back is pivotally coupled to the seat cushion. A four-bar linkage includes a front link extending longitudinally between a first end and an opposite second end, the first end rotatably coupled to the front portion of the seat cushion at a first pivot point, and the second end rotatably coupled at a second pivot point. The four-bar linkage also includes a rear link extending longitudinally between a first end and an opposite second end, the first end rotatably coupled to the rear portion of the seat cushion at a third pivot point, and the second end rotatably coupled at a fourth pivot point. The four-bar linkage rotates to move the seat assembly between a stow position in which the seat back pivots toward and overlaps the seat cushion and the seat cushion lowers toward the floor of the automotive vehicle such that the third pivot point is disposed below a line extending between the first pivot point and the fourth pivot point, a design position in which the seat cushion is spaced from the floor of the automotive vehicle and the seat back is disposed generally upright to support the occupant, and an easy entry position intermediate the stow position and the design position in which the seat assembly tilts forwardly and downwardly toward the floor of the automotive vehicle to allow ingress and egress behind the seat assembly

BRIEF DESCRIPTION OF THE DRAWINGS

Advantages of the present disclosure will be readily appreciated as the same becomes better understood by reference to the following detailed description when considered in connection with the accompanying drawings wherein:

FIG. 1A is a side view of a seat assembly for use in an automotive vehicle in an easy entry position according to one embodiment of the present invention;

FIG. 1B is a side view of the seat assembly of FIG. 1A in a design position;

FIG. 1C is a side view of the seat assembly of FIG. 1A in a stow position;

DETAILED DESCRIPTION OF THE EMBODIMENTS

Figure 2:
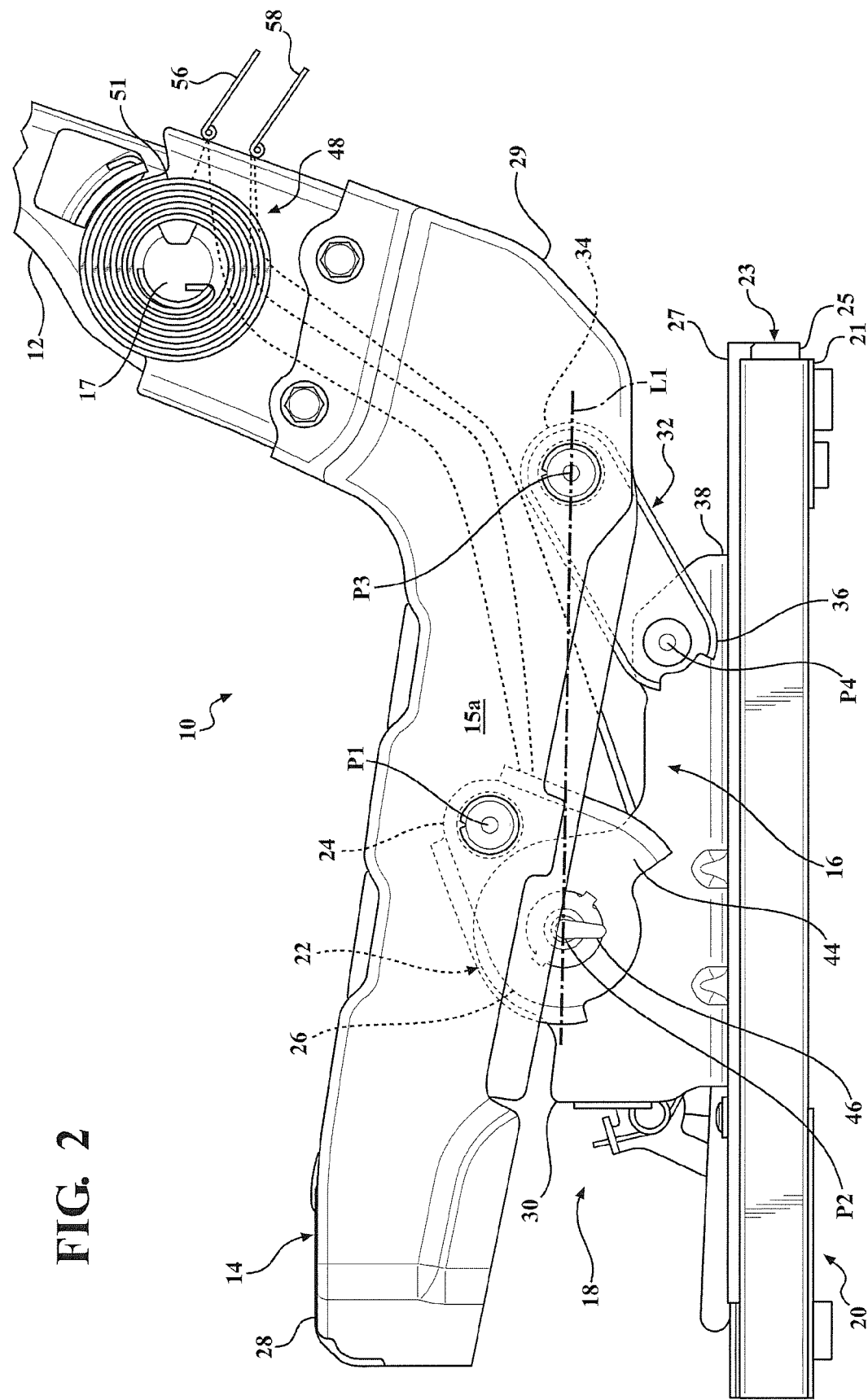
FIG. 2 is a fragmentary side view of the seat assembly of FIG. 1A in the design position.

Referring to the Figures, wherein like numerals indicate like or corresponding parts throughout the several views, a seat assembly adapted to be mounted to a floor of an automotive vehicle is generally shown at 10. The seat assembly 10 includes a seat back 12 operatively coupled to a seat cushion 14 by a pivot mechanism 17 for allowing selective pivotal movement of the seat back 12 relative to the seat cushion 14 between a plurality of reclined positions and a fold-flat position in which the seat back 12 overlaps the seat cushion 14. The seat assembly 10 further includes a four-bar linkage 16 coupled between the seat cushion 14 and a seat base 18 with a front portion 30 and a rear portion 38, the four-bar linkage 16 rotatable for moving and tilting the seat cushion 14 relative to the floor of the automotive vehicle. The seat base 18 may be mounted directly to the floor of the automotive vehicle or coupled to a seat track assembly 20 for providing fore and aft movement of the seat assembly 10 in the automotive vehicle. The seat track assembly 20 includes a pair of laterally spaced apart lower tracks 21 mounted to the floor of the automotive vehicle and a pair of laterally spaced apart upper tracks 23 with first sides 25 slidably coupled to the lower tracks 21 and opposite second sides 27 secured to the seat base 18. Although only one lower and upper track is shown in the Figures, it is appreciated that each pair of lower and upper tracks are substantially the same.

Figure 9:
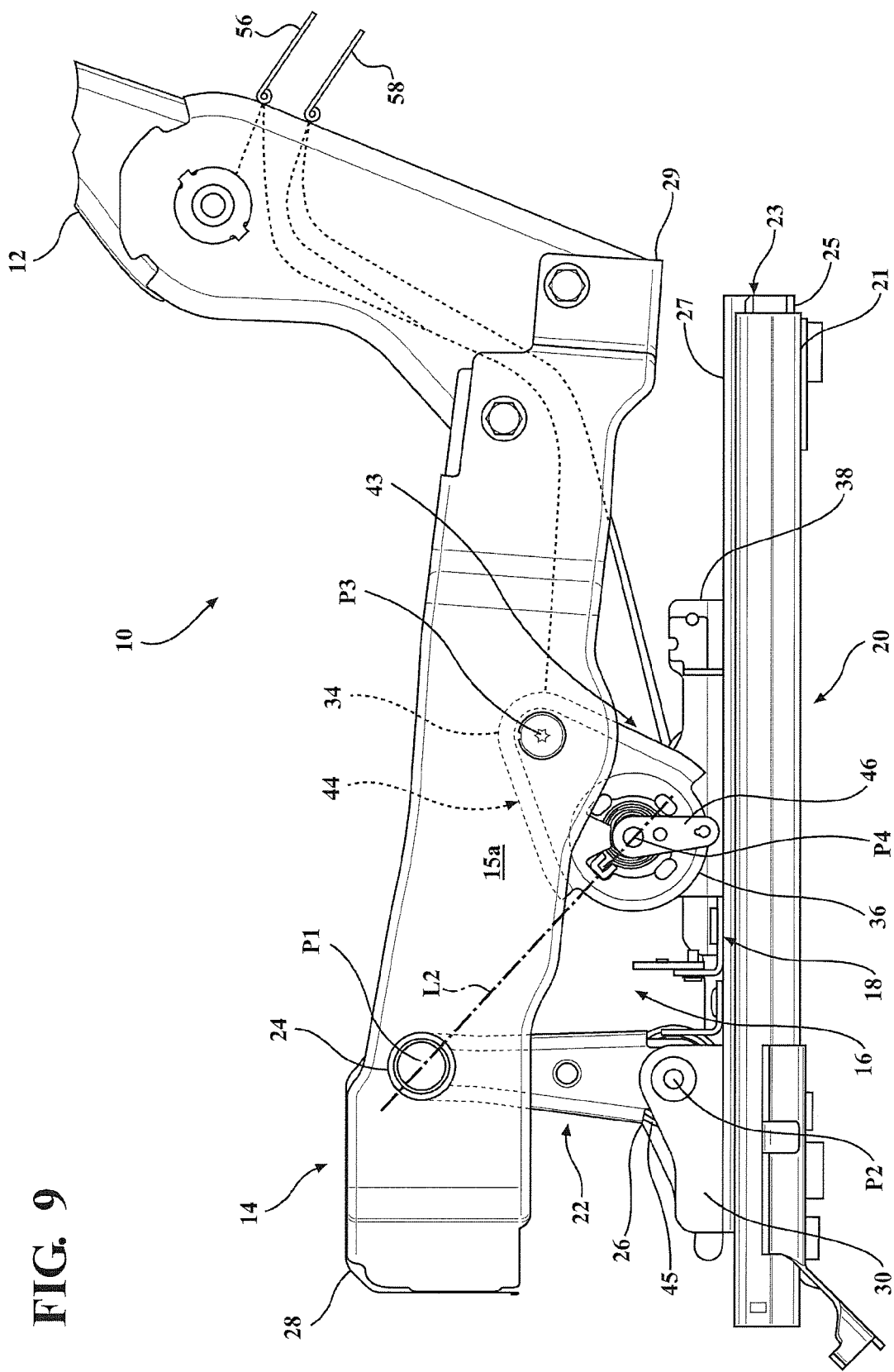
FIG. 9 is a fragmentary side view of the seat assembly of FIG. 8A in the design position.

Referring to FIGS. 2 and 9, the seat cushion 14 extends between a front portion 28 and a rear portion 29 with opposite lateral sides 15a, 15b. The four-bar linkage 16 includes a front link 22 disposed at each lateral side 15a, 15b of the seat cushion 14 adjacent to the front portion 28 and a rear link 32 disposed at each lateral side 15a, 15b of the seat cushion 14 adjacent to the rear portion 29. Each front link 22 extends longitudinally between a first end 24 and an opposite second end 26. The first ends 24 of the front links 22 are rotatably coupled to the front portion 28 of the seat cushion 14 at a first pivot point P1, and the second ends 26 of the front links 22 are rotatably coupled to the front portion 30 of the seat base 18 at a second pivot point P2. Similarly, each rear link 32 extends longitudinally between a first end 34 and an opposite second end 36. The first ends 34 of the rear links 32 are rotatably coupled to the rear portion 29 of the seat cushion 14 at a third pivot point P3, and the second ends 36 of the rear links 32 are rotatably coupled to the rear portion 38 of the seat base 18 at a fourth pivot point P4. A first support bar 40 extends between the first ends 24 of the front links 22, and a second support bar 42 extends between the second ends 26 of the front links 22, thereby ensuring the front links 22 on each lateral side 15a, 15b of the seat cushion 14 move in tandem. Although only one set of links is shown in the Figures, it is to be appreciated that each pair of front links 22 and each pair of rear links 32 are substantially the same.

A lower locking mechanism 44 with a lower release latch 46 is operably coupled between the front link 22 and the front portion 30 of the seat base 18 for selectively locking and unlocking the front link 22 at the second pivot point P2, thereby selectively preventing and allowing rotation of the four-bar linkage 16. In an alternative embodiment, shown in FIGS. 8-11, the lower locking mechanism 44 and lower release latch 46 are operably coupled between the rear link 32 and the rear portion 38 of the seat base 18 for selectively locking and unlocking the rear link 32 at the fourth pivot point P4. One potential type of locking and release mechanism for use in both the primary and alternative embodiments is a disc recliner mechanism described in U.S. Pat. No. 8,459,743, the disclosure of which is hereby incorporated by reference in its entirety. However, it is to be appreciated that any suitable locking and release mechanism known in the art could be substituted without varying the scope of the invention; for example, a latching mechanism could extend from the rear portion 29 of the seat cushion 14 for removably coupling to the rear portion 38 of the seat base 18 to selectively lock and prevent rotation of the four-bar linkage 16. A lower biasing mechanism 45, such as a torsion spring, is also disposed at the second pivot point P2 of the front link 22 to provide a biasing force sufficient to rotatably bias the front link 22, and thus, the four-bar linkage 16, in a first direction (counterclockwise when viewed from FIGS. 2 and 9).

The pivot mechanism 17 includes an upper locking mechanism 48 with an upper release latch 50 for selectively locking and allowing pivoting of the seat back 12 relative to the seat cushion 14. One potential type of locking and release mechanism for use at the pivot mechanism 17 is a disc recliner mechanism described in U.S. Pat. No. 8,459,743, the disclosure of which is hereby incorporated by reference in its entirety. It should be appreciated, however, that any suitable locking and release mechanism known in the art could be substituted without varying the scope of the invention. An upper biasing mechanism 51, such as a torsion spring, is also disposed at the pivot mechanism 17 to provide a biasing force sufficient to pivotally bias the seat back 12 to the fold-flat position.

Figure 5:
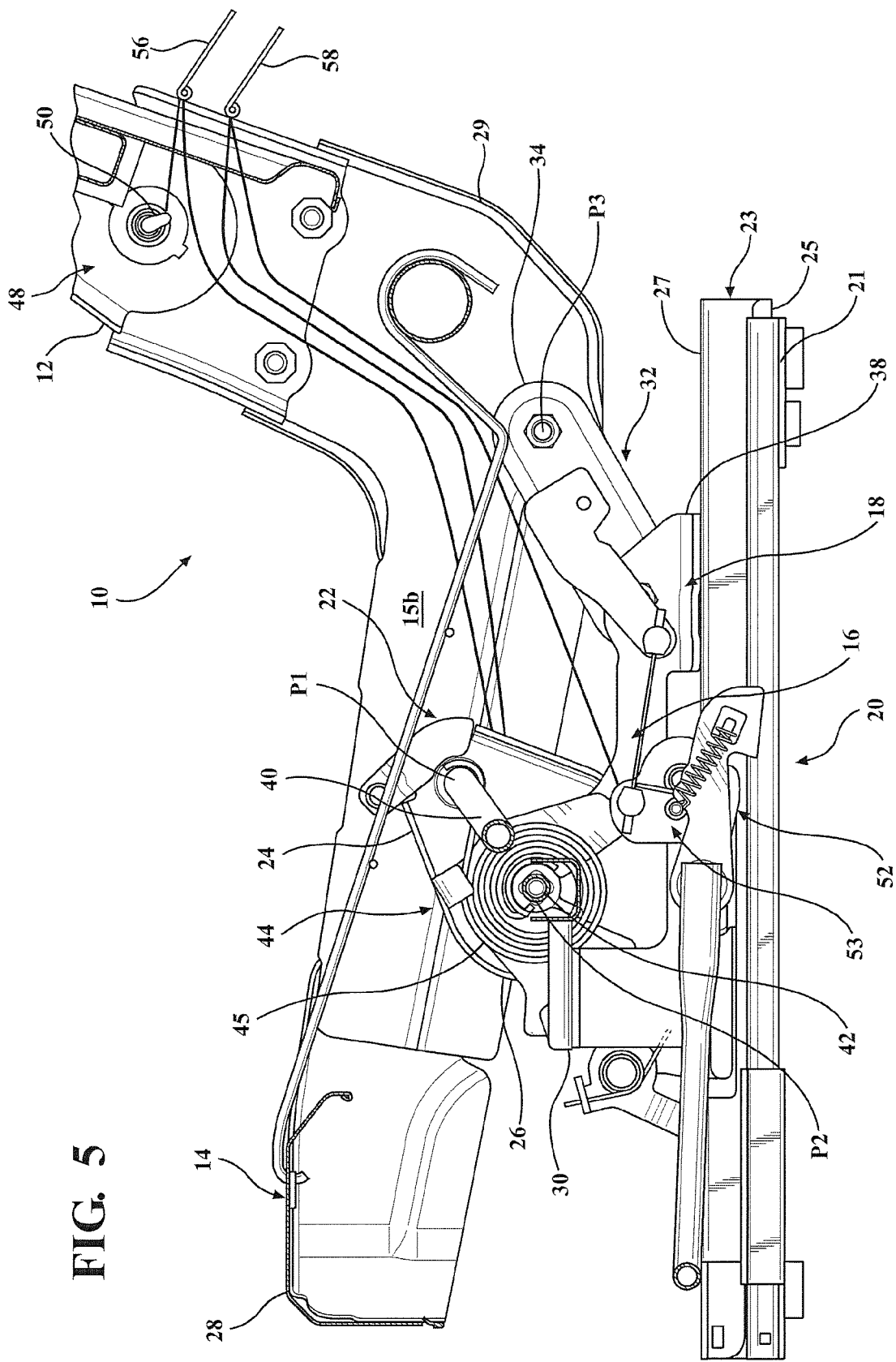
FIG. 5 is a fragmentary cross-sectional side view of the seat assembly of FIG. 1A in the design position.
Figure 6:
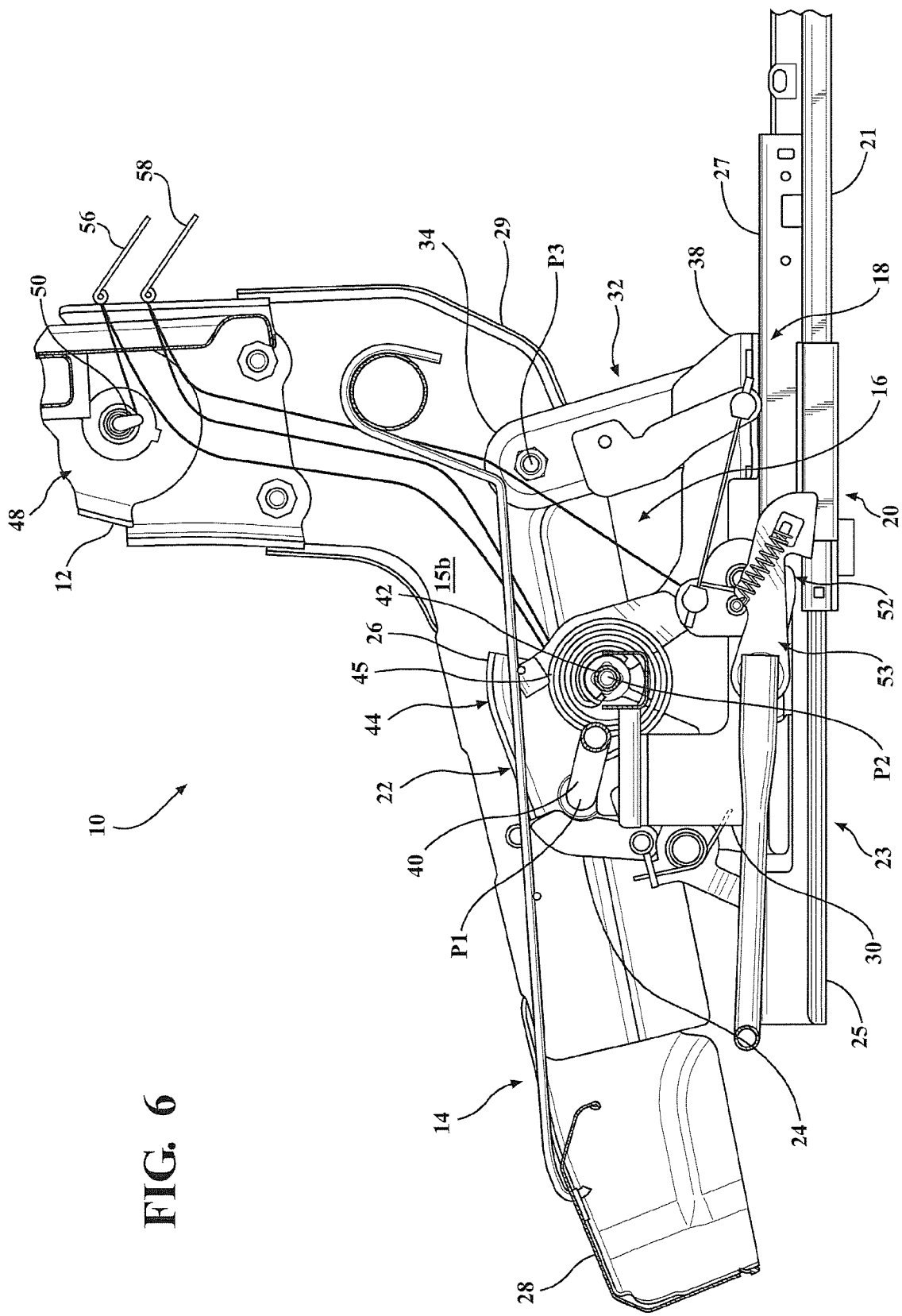
FIG. 6 is a fragmentary cross-sectional side view of the seat assembly of FIG. 1A in the easy entry position.
Figure 7:
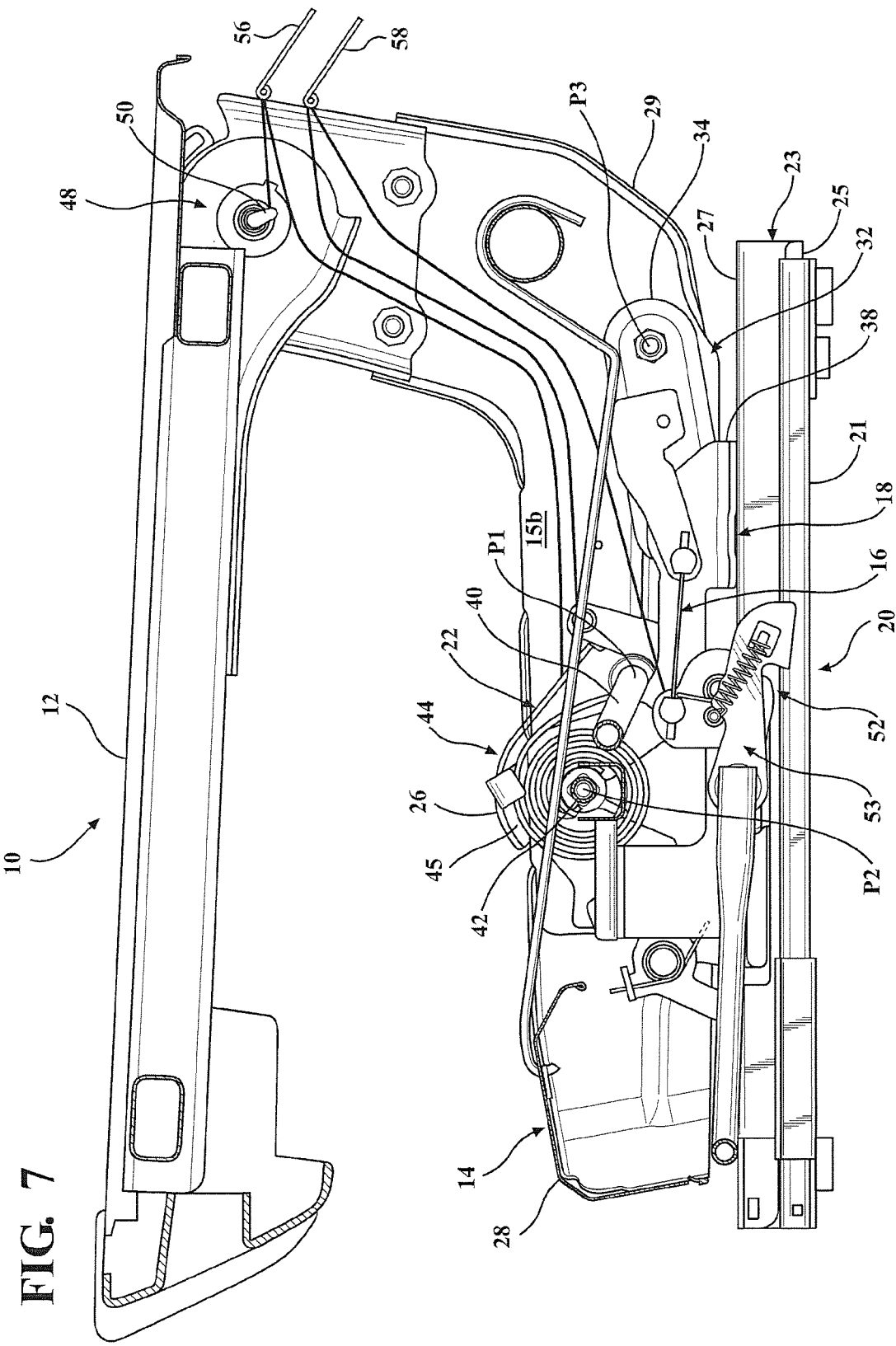
FIG. 7 is a cross-sectional side view of the seat assembly of FIG. 1A in the stow position.

Referring to FIGS. 5-7, the seat track assembly 20 also includes a track locking mechanism 52 with a track release mechanism 53 operably coupled between the seat base 18 and the seat track assembly 20 for selectively locking and allowing sliding motion of the seat assembly 10 from an origin point to a predetermined stop point on the lower track 21. One potential type of track locking and release mechanism for use in the seat track assembly 20 is described in U.S. Pat. No. 8,967,719, the disclosure of which is hereby incorporated by reference in its entirety. It should be appreciated, however, that any suitable track locking and release mechanism known in the art could be substituted without varying the scope of the invention. Alternatively, the seat track assembly 20 may also have a track spring coupled between the lower track 21 and the upper track 23 to bias the upper track 23, and therefore, the seat assembly 10, to slide forward from the origin point to the predetermined stop point on the lower track 21.

Conventional means of handle actuation known in the art, such as a cable-type actuation assembly, are used to selectively actuate the lower locking mechanism 44, the upper locking mechanism 48, and the track locking mechanism 52. However, it should be appreciated that a number of alternative handle actuation mechanisms known in the art may be used without varying the scope of the invention. A first cable-type actuation assembly 56 extends between the lower release latch 46 and the upper release latch 50 to simultaneously unlock the lower locking mechanism 44 and the upper locking mechanism 48. Similarly, a second cable-type actuation assembly 58 extends between the lower release latch 46 and the track release mechanism 53 to simultaneously unlock the lower locking mechanism 44 and the track locking mechanism 52.

The seat assembly 10 provides for movement between a design position for supporting an occupant, an easy entry position for increased ingress and egress room behind the seat assembly 10, and a stow position for increased cargo room in the automotive vehicle. However, it should be appreciated that the seat assembly 10 may be moved to any number of positions not discussed herein. As shown in FIGS. 1B, 2, 8B, and 9, the seat assembly 10 is disposed in the design position for supporting the occupant in the automotive vehicle. In the design position, the lower locking mechanism 44 locks the four-bar linkage 16 such that the seat cushion 14 is spaced from and tilted slightly rearwardly and downwardly toward the floor of the automotive vehicle. In the primary embodiment, the first pivot point P1 is disposed above a first line L1 defined as extending between the second pivot point P2 and the third pivot point P3. In the alternative embodiment, the third pivot point P3 is disposed above a second line L2 defined as extending between the first pivot point P1 and the fourth pivot point P4. The upper locking mechanism 48 locks the seat back 12 generally upright in the automotive vehicle. Further, the track locking mechanism 52 locks the seat track assembly 20 at the origin point to prevent fore and aft sliding movement of the seat assembly 10 along the seat track assembly 20.

Figure 3:
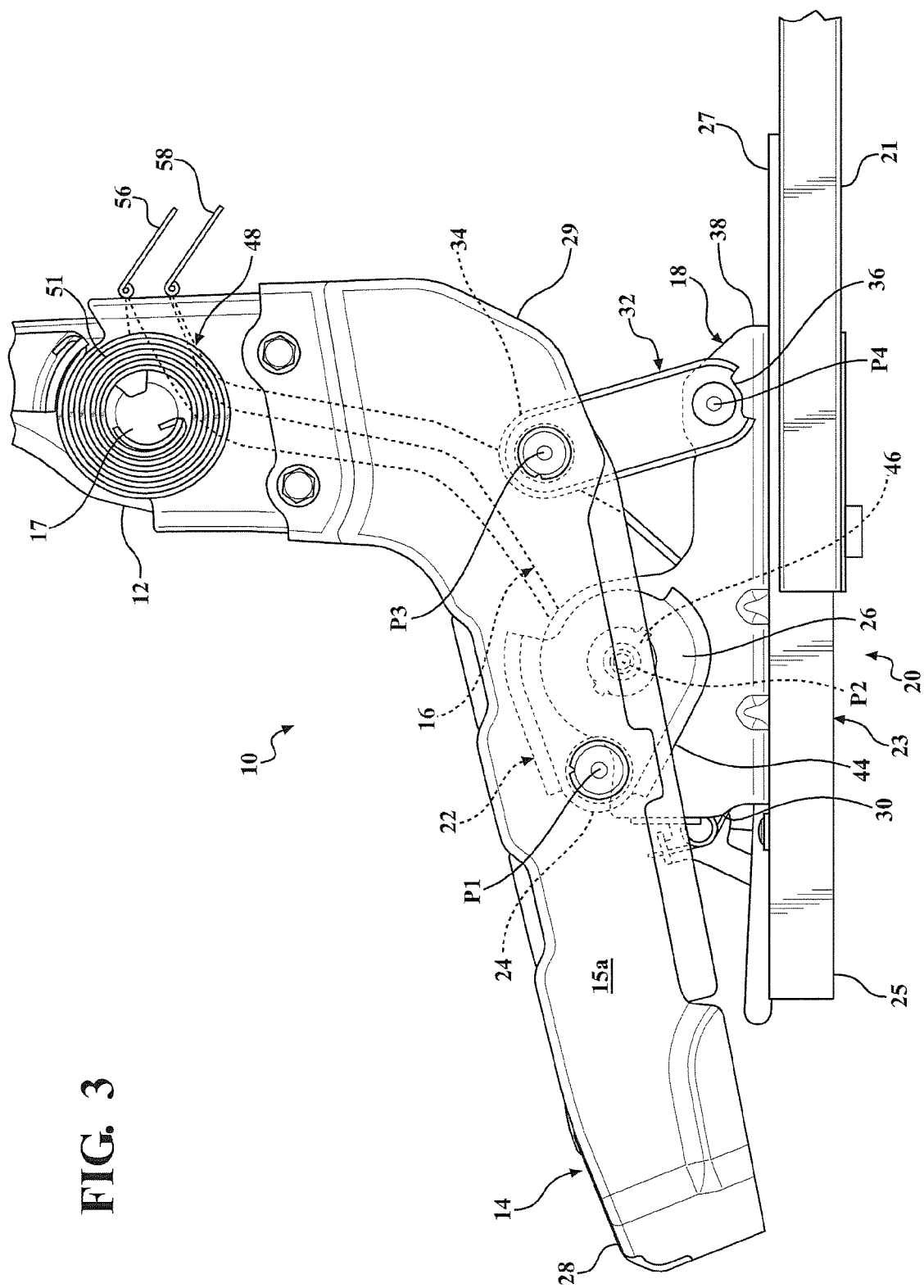
FIG. 3 is a fragmentary side view of the seat assembly of FIG. 1A in the easy entry position.

Referring to operation of the primary embodiment shown in FIGS. 1-7, a user actuates the second cable-type actuation assembly 58 to move the seat assembly 10 between the design position and the easy entry position, shown in FIGS. 1A and 3. Actuation of the second cable-type actuation assembly 58 actuates both the lower release latch 46 and the track release mechanism 53, simultaneously unlocking the lower locking mechanism 44 and the track locking mechanism 52. The four-bar linkage 16 is correspondingly unlocked and the front and rear links 22, 32 rotate in the first direction (counterclockwise when viewed from FIG. 2) due to the biasing force of the lower biasing mechanism 45. The seat cushion 14 therefore tilts forwardly and downwardly toward the floor of the automotive vehicle. The seat track assembly 20 is also unlocked, causing the upper tracks 23 to slide forward along the lower tracks 21 to the predetermined stop point due to the forward movement of mass of the seat assembly 10 and/or the biasing force of the track spring. Because the upper release latch 50 is not actuated during actuation of the second cable-type assembly, the seat back 14 remains locked and cannot pivot at the pivot mechanism 17.

Figure 4:
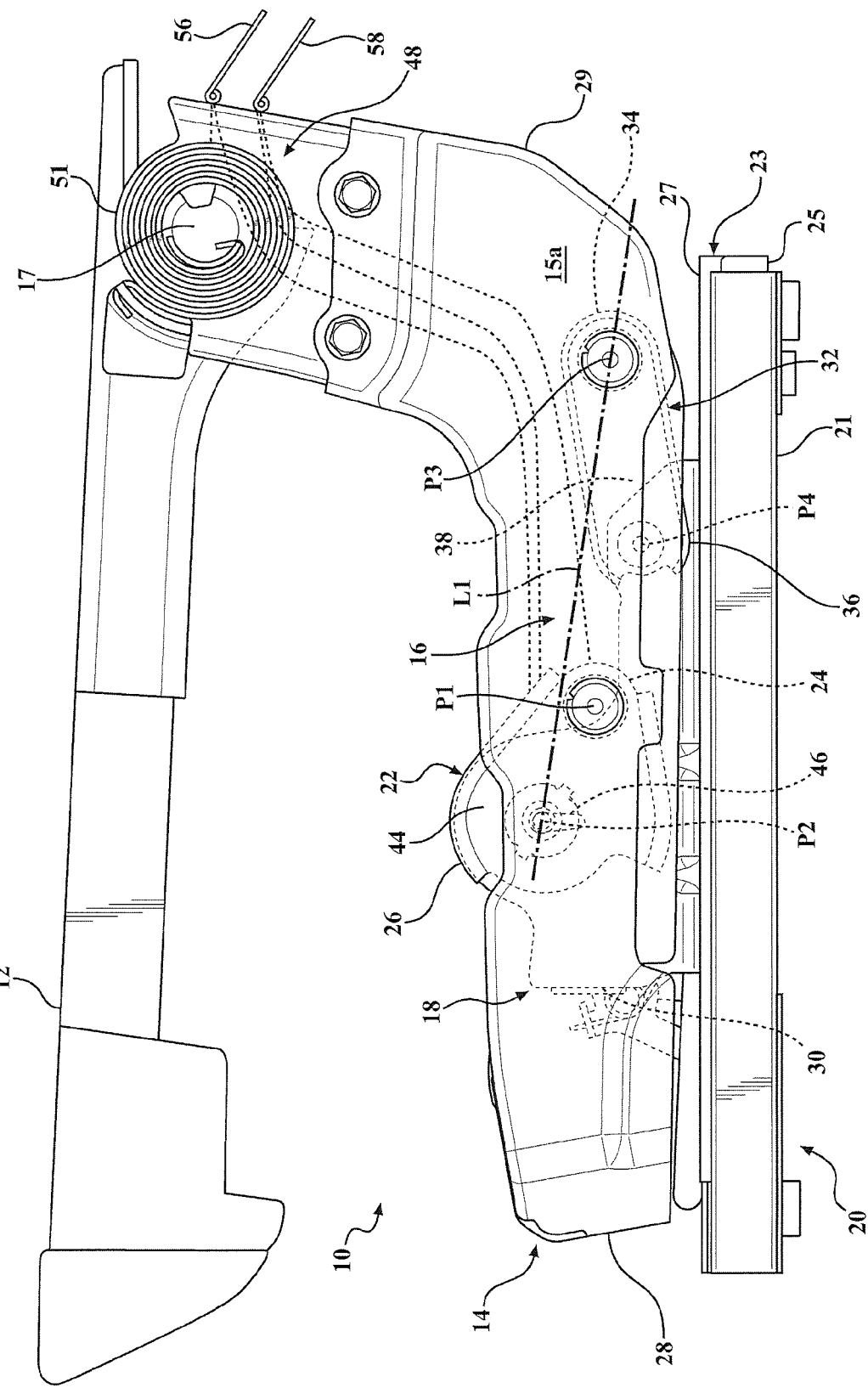
FIG. 4 is a fragmentary side view of the seat assembly of FIG. 1A in the stow position.

The user actuates the first cable-type actuation assembly 56 to move the seat assembly 10 between the design position and the stow position, shown in FIGS. 1C and 4. Actuation of the first cable-type actuation assembly 56 actuates both the upper release latch 50 and the lower release latch 46, simultaneously unlocking the upper locking mechanism 48 and the lower locking mechanism 44. With the upper locking mechanism 48 unlocked, the seat back 12 pivots at the pivot mechanism 17 toward the floor of the automotive vehicle and overlaps the seat cushion 14 due to the biasing force of the upper biasing mechanism 51. With the lower locking mechanism 44 unlocked, the user is able to push rearwardly on the seat cushion 14 to overcome the biasing force of the lower biasing mechanism 45, thereby simultaneously rotating the front and rear links 22, 32 in a second direction (clockwise when viewed from FIG. 2) opposite the first direction. The seat cushion 14 correspondingly squats downwardly toward the floor of the automotive vehicle such that the first pivot point P1 is now disposed below the first line L1 extending between the second pivot point P2 and the third pivot point P3. Because the track release mechanism 53 is not actuated during actuation of the first cable-type assembly, the seat track assembly 20 remains locked and cannot slide the seat assembly 10 from the origin point. Once the seat assembly 10 reaches the stow position, the seat back 12 may alternatively lock at the upper locking mechanism 48 and the four-bar linkage 16 may alternatively lock at the lower locking mechanism 44.

The user may sequentially actuate the second and first cable-type actuation assemblies 58, 56 to move the seat assembly 10 directly from the easy entry position to the stow position without intermediately returning to the design position. Actuation of the second and first cable-type actuation assemblies 58, 56 actuates the lower release latch 46, the upper release latch 50, and the track release mechanism 53, thereby respectively unlocking the lower locking mechanism 44, the upper locking mechanism 48, and the track locking mechanisms 52. With the upper locking mechanism 48 unlocked, the seat back 12 pivots at the pivot mechanism 17 toward the floor of the automotive vehicle and overlaps the seat cushion 14 due to the biasing force of the upper biasing mechanism 51. With the lower locking mechanism 44 unlocked, the user is able to push rearwardly on the seat cushion 14 to overcome the biasing force of the lower biasing mechanism 45, thereby simultaneously rotating the front and rear links 22, 32 in the second direction. The seat cushion 14 correspondingly moves from being forwardly and downwardly tilted to squatting downwardly toward the floor of the automotive vehicle such that the first pivot point P1 is disposed below the first line L1. Further, with the track locking mechanism 52 unlocked, the user is able to rearwardly slide the seat assembly 10 to overcome the biasing force of the track spring and return the seat assembly 10 to the origin point on the seat track assembly 20. Once the seat assembly 10 reaches the stow position, the four-bar linkage 16, the seat back 12, and the seat track assembly 20 may alternatively lock in place to secure the seat assembly 10.

Operation of the alternative embodiment, shown in FIGS. 8-11 and described in the following paragraphs, is similar to operation of the primary embodiment. The user actuates the first cable-type actuation assembly 56 to move the seat assembly 10 between the design position and the stow position. Actuation of the first cable-type actuation assembly 56 actuates both the upper release latch 50 and the lower release latch 46, simultaneously unlocking the upper locking mechanism 48 and the lower locking mechanism 44. With the upper locking mechanism 48 unlocked, the seat back 12 pivots at the pivot mechanism 17 toward the floor of the automotive vehicle and overlaps the seat cushion 14 due to the biasing force of the upper biasing mechanism 51. With the lower locking mechanism 44 unlocked, the front and rear links 22, 32 rotate in the first direction (counterclockwise when viewed from FIG. 9) due to the biasing force of the lower biasing mechanism 45. The seat cushion 14 correspondingly squats downwardly toward the floor of the automotive vehicle such that the third pivot point P3 is disposed below the second line L2 extending between the first pivot point P1 and the fourth pivot point P4. Because the track release mechanism 53 is not actuated during actuation of the first cable-type assembly 56, the seat track assembly 20 remains locked and cannot slide the seat assembly 10 from the origin point. Once the seat assembly 10 reaches the stow position, the seat back 12 may alternatively lock at the upper locking mechanism 48 and the four-bar linkage 16 may alternatively lock at the lower locking mechanism 44.

Figure 8A:
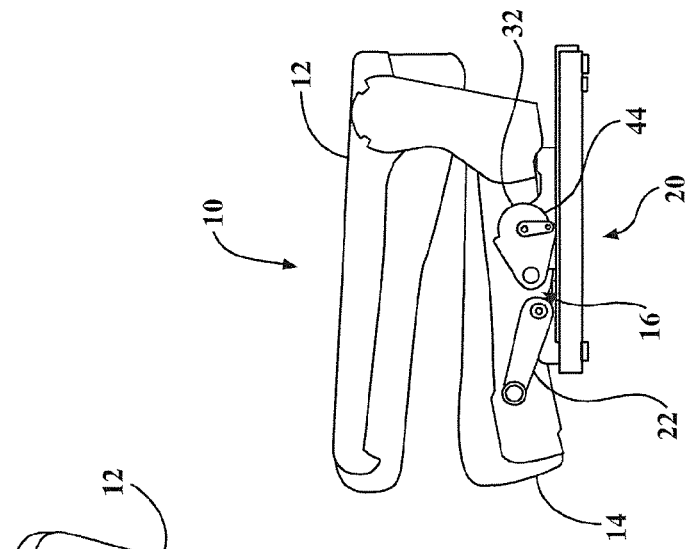
FIG. 8A is a side view of a seat assembly for use in an automotive vehicle in an easy entry position according to an alternative embodiment of the present invention.
Figure 8B:
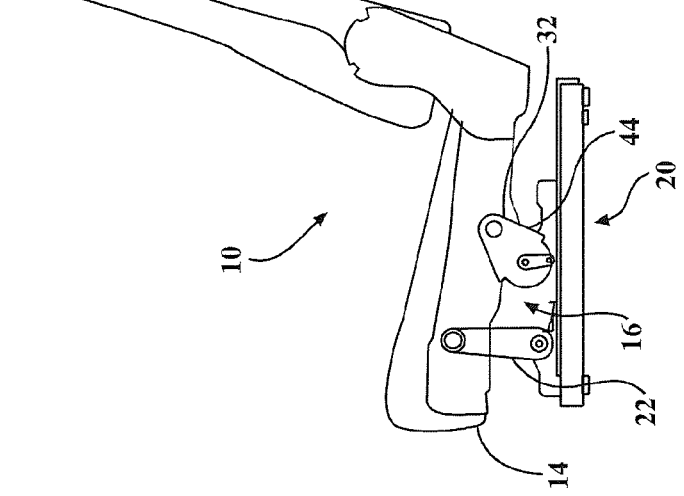
FIG. 8B is a side view of the seat assembly of FIG. 8A in a design position.
Figure 8C:
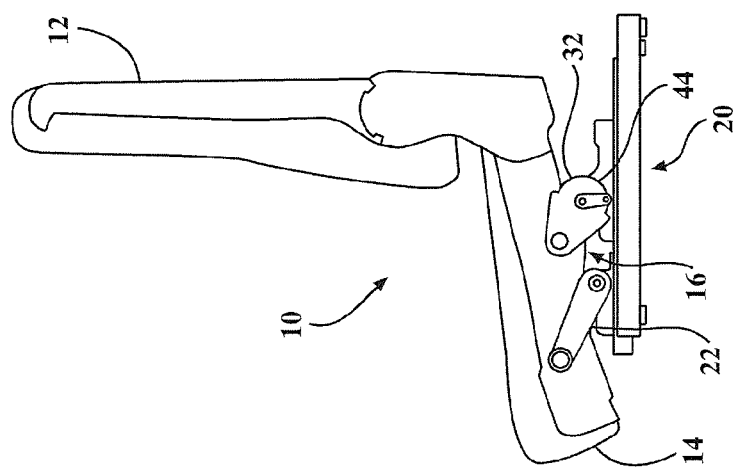
FIG. 8C is a side view of the seat assembly of FIG. 8A in a stow position.
Figure 10:
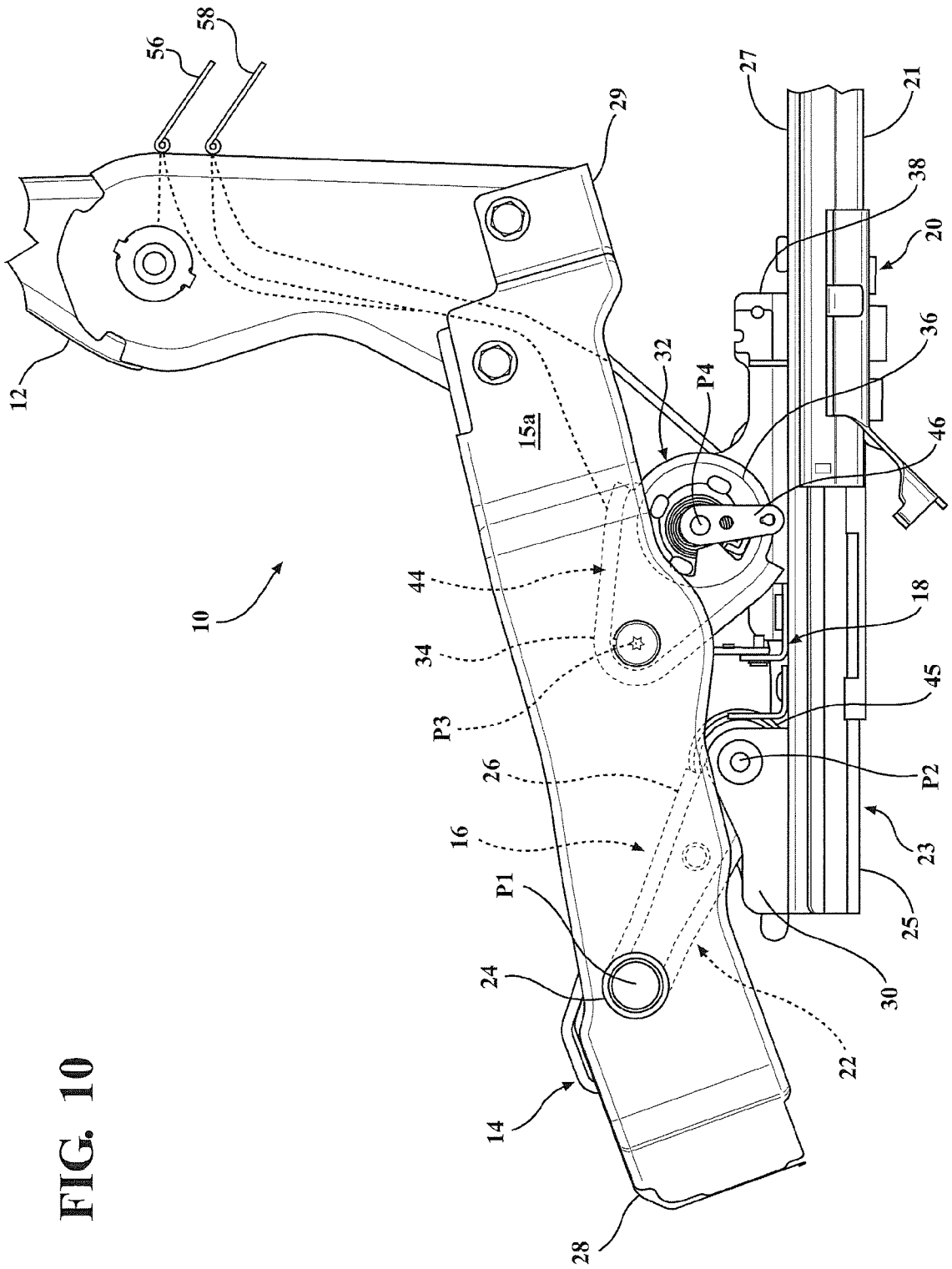
FIG. 10 is a fragmentary side view of the seat assembly of FIG. 8A in the easy entry position.
Figure 11:
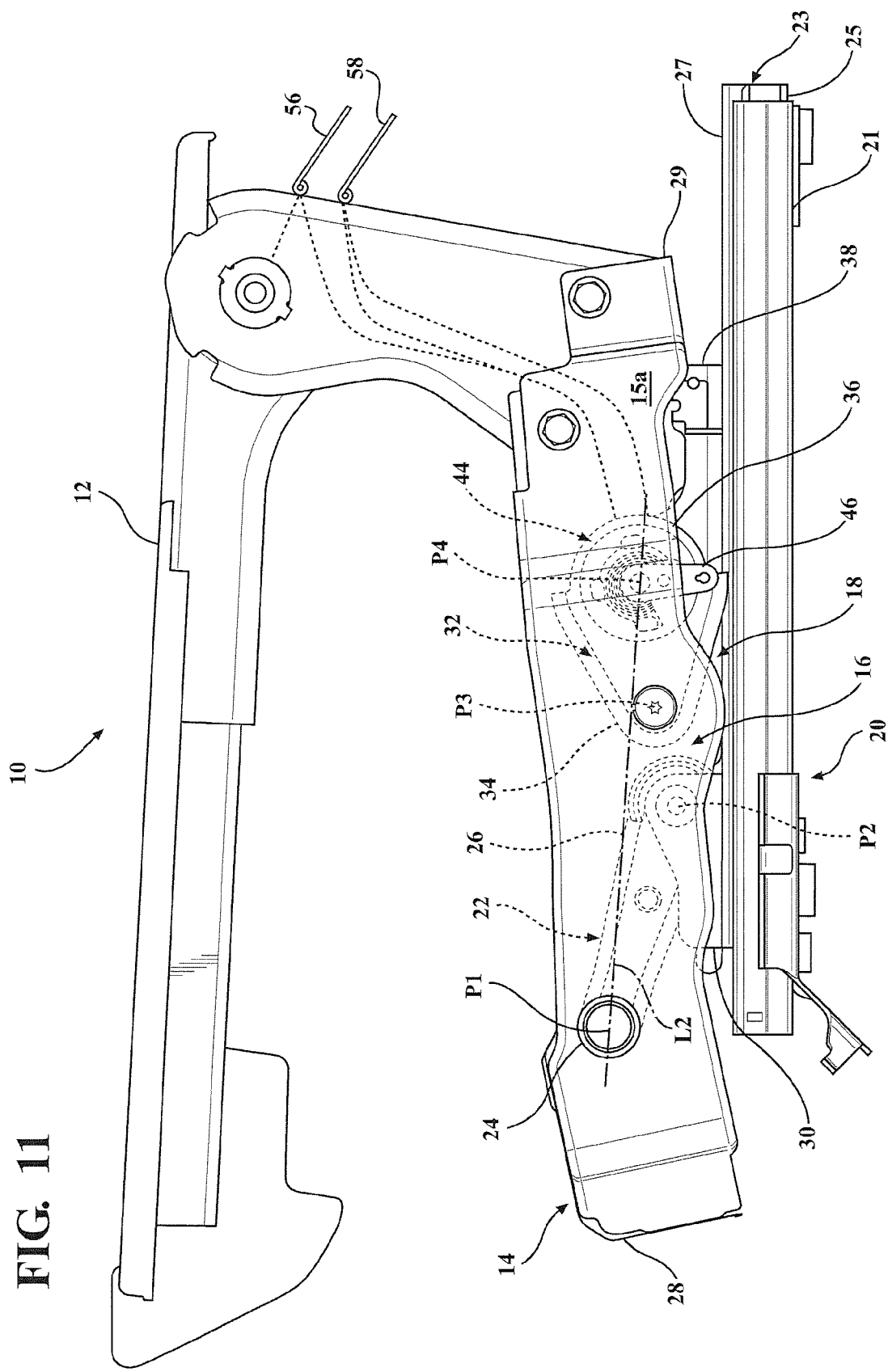
FIG. 11 is a fragmentary side view of the seat assembly of FIG. 8A in the stow position.

The user actuates the second cable-type assembly 58 to move the seat assembly 10 between the design position and the easy entry position, which is shown in FIGS. 8A and 10. Actuation of the second cable-type actuation assembly 58 actuates both the lower release latch 46 and the track release mechanism 53, simultaneously unlocking the lower locking mechanism 44 and the track locking mechanism 52. The seat track assembly 20 is unlocked, causing the upper tracks 23 to slide forward along the lower tracks 21 to the predetermined stop point due to the forward movement of mass of the seat assembly 10 and/or the biasing force of the track spring. The four-bar linkage 16 is also unlocked, causing the front and rear links 22, 32 rotate in the first direction due to the biasing force of the lower biasing mechanism 45, thus tilting the seat cushion 14 forwardly and downwardly toward the floor of the automotive vehicle. Because the upper release latch 50 is not actuated, the seat back 14 remains locked and cannot pivot at the pivot mechanism 17.

As with the primary embodiment, the user may sequentially actuate the second and first cable-type actuation assemblies 58, 56 in the alternative embodiment to move the seat assembly 10 directly from the easy entry position to the stow position without intermediately returning to the design position. Actuation of the second and first cable-type actuation assemblies 58, 56 actuates the lower release latch 46, the upper release latch 50, and the track release mechanism 53, thereby respectively unlocking the lower locking mechanism 44, the upper locking mechanism 48, and the track locking mechanisms 52. With the upper locking mechanism 48 unlocked, the seat back 12 pivots at the pivot mechanism 17 toward the floor of the automotive vehicle and overlaps the seat cushion 14 due to the biasing force of the upper biasing mechanism 51. With the lower locking mechanism 44 unlocked, the front and rear links 22, 32 rotate in the first direction due to the biasing force of the lower biasing mechanism 45. The seat cushion 14 correspondingly moves from being forwardly and downwardly tilted to squatting downwardly toward the floor of the automotive vehicle such that the third pivot point P3 is disposed below the second line L2. Further, with the track locking mechanism 52 unlocked, the user is able to rearwardly slide the seat assembly 10 to overcome the biasing force of the track spring and return the seat assembly 10 to the origin position on the seat track assembly 20. Once the seat assembly 10 reaches the stow position, the four-bar linkage 16, the seat back 12, and the seat track assembly 20 may alternatively lock in place to secure the seat assembly 10.

The invention has been described in an illustrative manner, and it is to be understood that the terminology which has been used is intended to be in the nature of words of description rather than of limitation. Directional references employed or shown in the description, figures or claims, such as top, bottom, upper, lower, upward, downward, lengthwise, widthwise, longitudinal, lateral, and the like, are relative terms employed for ease of description and are not intended to limit the scope of the invention in any respect. Many modifications and variations of the present invention are possible in light of the above teachings. It is, therefore, to be understood that within the scope of the appended claims, the invention may be practiced other than as specifically described.

What is claimed is:

1. A seat assembly adapted to be mounted to a floor of an automotive vehicle for movement between a plurality of positions, the seat assembly comprising:

a seat cushion having a front portion and a rear portion for supporting an occupant in the automotive vehicle;

a seat back pivotally coupled to the seat cushion; and
a four-bar linkage comprising
    a front link extending longitudinally between a first end and an opposite second end, the first end rotatably coupled to the front portion of the seat cushion at a first pivot point (P1), and the second end rotatably coupled at a second pivot point (P2), and
    a rear link extending longitudinally between a first end and an opposite second end, the first end rotatably coupled to the rear portion of the seat cushion at a third pivot point (P3), and the second end rotatably coupled at a fourth pivot point (P4);
    wherein the front and rear links are rotatable in a first direction for moving the seat assembly between a design position in which the seat cushion is spaced from the floor of the automotive vehicle and the seat back is disposed generally upright to support the occupant, and an easy entry position in which the seat assembly tilts forwardly and downwardly toward the floor of the automotive vehicle to allow ingress and egress behind the seat assembly; and
    wherein the front and rear links are rotatable in a second direction opposite the first direction for moving the seat assembly between the design position and a stow position in which the seat cushion lowers toward the floor of the automotive vehicle and the seat back pivots toward and overlaps the seat cushion, and for moving the seat assembly between the easy entry position and the stow position.

2. The seat assembly of claim 1 further comprising a seat base coupled to the second end of the front link and the second end of the rear link for mounting the seat assembly in the automotive vehicle.

3. The seat assembly of claim 2 wherein the seat base is slidably coupled to a seat track assembly for providing fore and aft movement of the seat assembly in the automotive vehicle.

4. The seat assembly of claim 3 wherein the seat track assembly includes a lower track mounted to the vehicle floor and an upper track with a first end slidably coupled to the lower track and an opposite second end secured to the seat base.

5. The seat assembly of claim 4 wherein the seat assembly slides along the seat track assembly in a fore direction when the seat assembly is moved to the easy entry position and in an aft direction opposite the fore direction when the seat assembly is moved from the easy entry position.

6. The seat assembly of claim 5 further comprising a lower locking mechanism operably coupled between one of the front and rear links and the seat base for selectively locking and preventing rotation of the four-bar linkage.

7. The seat assembly of claim 5 further comprising a latching mechanism extending from the seat cushion for removably coupling to the seat base to selectively lock and prevent rotation of the four-bar linkage.

8. The seat assembly of claim 6 wherein the lower locking mechanism is operably coupled between the front link and the seat base for selectively locking the front link at the second pivot point (P2) and preventing rotation of the four-bar linkage.

9. The seat assembly of claim 8 further comprising a lower release mechanism operably coupled between the front link and the seat base for actuation of the lower locking mechanism to selectively allow rotation of the four-bar linkage.

10. The seat assembly of claim 9 further comprising a biasing mechanism at the second pivot point (P2) to bias the four-bar linkage in the first direction.

11. The seat assembly of claim 10 further comprising an upper locking mechanism operably coupled between the seat back and the seat cushion for selectively locking and preventing pivoting of the seat back.

12. The seat assembly of claim 11 further comprising an upper release mechanism operably coupled between the seat back and the seat cushion for actuation of the upper locking mechanism to selectively allow pivoting of the seat back.

13. The seat assembly of claim 12 further comprising a biasing mechanism coupled between the seat back and the seat cushion to bias the seat back to pivot toward the seat cushion.

14. The seat assembly of claim 13 further comprising a track locking mechanism operably coupled between the seat base and the seat track assembly for selectively locking and preventing sliding motion of the seat assembly along the seat track assembly.

15. The seat assembly of claim 14 further comprising a track release mechanism operably coupled between the seat base and the seat track assembly for actuation of the track locking mechanism to selectively allow sliding motion of the seat assembly along the seat track assembly.

16. The seat assembly of claim 15 further comprising a spring coupled between the upper and lower tracks of the seat track assembly to bias the seat assembly in the fore direction along the seat track assembly.

17. The seat assembly of claim 16 further comprising a first actuation assembly attached to the upper release mechanism and the lower release mechanism, wherein actuation of the first actuation assembly simultaneously actuates the upper release mechanism to unlock the upper locking mechanism and the lower release mechanism to unlock the lower locking mechanism.

18. The seat assembly of claim 17 further comprising a second actuation assembly attached to the lower release mechanism and the track release mechanism, wherein actuation of the second actuation assembly simultaneously actuates the lower release mechanism to unlock the lower locking mechanism and the track release mechanism to unlock the track locking mechanism.

19. A seat assembly adapted to be mounted to a floor of an automotive vehicle for movement between a plurality of positions, the seat assembly comprising:
    a seat cushion having a front portion and a rear portion for supporting an occupant in the automotive vehicle;
    a seat back pivotally coupled to the seat cushion; and
    a four-bar linkage comprising
        a front link extending longitudinally between a first end and an opposite second end, the first end rotatably coupled to the front portion of the seat cushion at a first pivot point (P1), and the second end rotatably coupled at a second pivot point (P2), and
        a rear link extending longitudinally between a first end and an opposite second end, the first end rotatably coupled to the rear portion of the seat cushion at a third pivot point (P3), and the second end rotatably coupled at a fourth pivot point (P4); and
        wherein the four-bar linkage rotates to move the seat assembly between an easy entry position in which the seat assembly tilts forwardly and downwardly toward the floor of the automotive vehicle to allow ingress and egress behind the seat assembly, a stow position in which the seat back pivots toward and overlaps the seat cushion and the seat cushion lowers toward the floor of the automotive vehicle such that the first pivot point (P1) is disposed below a line (L) extending between the second pivot point (P2) and the third pivot point (P3), and a design position intermediate the stow position and the easy entry position in which the seat cushion is spaced from the floor of the automotive vehicle and the seat back is disposed generally upright to support the occupant.

20. The seat assembly of claim 19 wherein the front and rear links rotate in a first direction for moving the seat assembly between the design position and the easy entry position.

21. The seat assembly of claim 20 wherein the front and rear links rotate in a second direction opposite the first direction for moving the seat assembly between the design position and the stow position.

22. The seat assembly of claim 21 wherein the front and rear links rotate in the second direction for moving the seat assembly between the easy entry position and the stow position.

23. The seat assembly of claim 22 further comprising a seat base coupled to the second end of the front link and the second end of the rear link for mounting the seat assembly in the automotive vehicle.

24. The seat assembly of claim 23 wherein the seat base is slidably coupled to a seat track assembly for providing fore and aft movement of the seat assembly in the automotive vehicle.

25. The seat assembly of claim 24 wherein the seat track assembly includes a lower track mounted to the vehicle floor and an upper track with a first end slidably coupled to the lower track and an opposite second end secured to the seat base.

26. The seat assembly of claim 25 wherein the seat assembly slides along the seat track assembly in a fore direction when the seat assembly is moved to the easy entry position and in an aft direction opposite the fore direction when the seat assembly is moved from the easy entry position.

27. The seat assembly of claim 26 further comprising a lower locking mechanism operably coupled between one of the front and rear links and the seat base for selectively locking and preventing rotation of the four-bar linkage.

28. The seat assembly of claim 26 further comprising a latching mechanism extending from the seat cushion for removably coupling to the seat base to selectively lock and prevent rotation of the four-bar linkage.

29. The seat assembly of claim 27 wherein the lower locking mechanism is operably coupled between the front link and the seat base for selectively locking the front link at the second pivot point (P2) and preventing rotation of the four-bar linkage.

30. The seat assembly of claim 29 further comprising a lower release mechanism operably coupled between the front link and the seat base for actuation of the lower locking mechanism to selectively allow rotation of the four-bar linkage.

31. The seat assembly of claim 30 further comprising a biasing mechanism at the second pivot point (P2) to bias the four-bar linkage in the first direction.

32. The seat assembly of claim 31 further comprising an upper locking mechanism operably coupled between the seat back and the seat cushion for selectively locking and preventing pivoting of the seat back.

33. The seat assembly of claim 32 further comprising an upper release mechanism operably coupled between the seat back and the seat cushion for actuation of the upper locking mechanism to selectively allow pivoting of the seat back.

34. The seat assembly of claim 33 further comprising a biasing mechanism coupled between the seat back and the seat cushion to bias the seat back to pivot toward the seat cushion.

35. The seat assembly of claim 34 further comprising a track locking mechanism operably coupled between the seat base and the seat track assembly for selectively locking and preventing sliding motion of the seat assembly along the seat track assembly.

36. The seat assembly of claim 35 further comprising a track release mechanism operably coupled between the seat base and the seat track assembly for actuation of the track locking mechanism to selectively allow sliding motion of the seat assembly along the seat track assembly.

37. The seat assembly of claim 36 further comprising a spring coupled between the upper and lower tracks of the seat track assembly to bias the seat assembly in the fore direction along the seat track assembly.

38. The seat assembly of claim 37 further comprising a first actuation assembly attached to the upper release mechanism and the lower release mechanism, wherein actuation of the first actuation assembly simultaneously actuates the upper release mechanism to unlock the upper locking mechanism and the lower release mechanism to unlock the lower locking mechanism.

39. The seat assembly of claim 38 further comprising a second actuation assembly attached to the lower release mechanism and the track release mechanism, wherein actuation of the second actuation assembly simultaneously actuates the lower release mechanism to unlock the lower locking mechanism and the track release mechanism to unlock the track locking mechanism.

40. A seat assembly adapted to be mounted to a floor of an automotive vehicle for movement between a plurality of positions, the seat assembly comprising:
   a seat cushion having a front portion and a rear portion for supporting an occupant in the automotive vehicle;
   a seat back pivotally coupled to the seat cushion; and
   a four-bar linkage comprising
   a front link extending longitudinally between a first end and an opposite second end, the first end rotatably coupled to the front portion of the seat cushion at a first pivot point (P1), and the second end rotatably coupled at a second pivot point (P2), and
   a rear link extending longitudinally between a first end and an opposite second end, the first end rotatably coupled to the rear portion of the seat cushion at a third pivot point (P3), and the second end rotatably coupled at a fourth pivot point (P4); and
   wherein the four-bar linkage rotates to move the seat assembly between a stow position in which the seat back pivots toward and overlaps the seat cushion and the seat cushion lowers toward the floor of the automotive vehicle such that the third pivot point (P3) is disposed below a line (L) extending between the first pivot point (P1) and the fourth pivot point (P4), a design position in which the seat cushion is spaced from the floor of the automotive vehicle and the seat back is disposed generally upright to support the occupant, and an easy entry position intermediate the stow position and the design position in which the seat assembly tilts forwardly and downwardly toward the floor of the automotive vehicle to allow ingress and egress behind the seat assembly.

41. The seat assembly of claim 40 wherein the front and rear links rotate in a first direction for moving the seat assembly between the design position and the easy entry position.

42. The seat assembly of claim 41 wherein the front and rear links rotate further in the first direction for moving the seat assembly between the easy entry position and the stow position.

43. The seat assembly of claim 42 wherein the front and rear links rotate in a second direction opposite the first direction for moving the seat assembly between the easy entry position or stowed position and the design position.

44. The seat assembly of claim 43 further comprising a seat base coupled to the second end of the front link and the second end of the rear link for mounting the seat assembly in the automotive vehicle.

45. The seat assembly of claim 44 wherein the seat base is slidably coupled to a seat track assembly for providing fore and aft movement of the seat assembly in the automotive vehicle.

46. The seat assembly of claim 45 wherein the seat track assembly includes a lower track mounted to the vehicle floor and an upper track with a first end slidably coupled to the lower track and an opposite second end secured to the seat base.

47. The seat assembly of claim 46 wherein the seat assembly slides along the seat track assembly in a fore direction when the seat assembly is moved to the easy entry position and in an aft direction opposite the fore direction when the seat assembly is moved from the easy entry position.

48. The seat assembly of claim 47 further comprising a lower locking mechanism operably coupled between one of the front and rear links and the seat base for selectively locking and preventing rotation of the four-bar linkage.

49. The seat assembly of claim 47 further comprising a latching mechanism extending from the seat cushion for removably coupling to the seat base to selectively lock and prevent rotation of the four-bar linkage.

50. The seat assembly of claim 48 wherein the lower locking mechanism is operably coupled between the rear link and the seat base for selectively locking the rear link at the fourth pivot point (P4) and preventing rotation of the four-bar linkage.

51. The seat assembly of claim 50 further comprising a lower release mechanism operably coupled between the rear link and the seat base for actuation of the lower locking mechanism to selectively allow rotation of the four-bar linkage.

52. The seat assembly of claim 51 further comprising a biasing mechanism at the second pivot point (P2) to bias the four-bar linkage in the first direction.

53. The seat assembly of claim 52 further comprising an upper locking mechanism operably coupled between the seat back and the seat cushion for selectively locking and preventing pivoting of the seat back.

54. The seat assembly of claim 53 further comprising an upper release mechanism operably coupled between the seat back and the seat cushion for actuation of the upper locking mechanism to selectively allow pivoting of the seat back.

55. The seat assembly of claim 54 further comprising a biasing mechanism coupled between the seat back and the seat cushion to bias the seat back to pivot toward the seat cushion.

56. The seat assembly of claim 55 further comprising a track locking mechanism operably coupled between the seat base and the seat track assembly for selectively locking and preventing sliding motion of the seat assembly along the seat track assembly.

57. The seat assembly of claim 56 further comprising a track release mechanism operably coupled between the seat base and the seat track assembly for actuation of the track locking mechanism to selectively allow sliding motion of the seat assembly along the seat track assembly.

58. The seat assembly of claim 57 further comprising a spring coupled between the upper and lower tracks of the seat track assembly to bias the seat assembly in the fore direction along the seat track assembly.

59. The seat assembly of claim 58 further comprising a first actuation assembly attached to the upper release mechanism and the lower release mechanism, wherein actuation of the first actuation assembly simultaneously actuates the upper release mechanism to unlock the upper locking mechanism and the lower release mechanism to unlock the lower locking mechanism.

60. The seat assembly of claim 59 further comprising a second actuation assembly attached to the lower release mechanism and the track release mechanism, wherein actuation of the second actuation assembly simultaneously actuates the lower release mechanism to unlock the lower locking mechanism and the track release mechanism to unlock the track locking mechanism.

* * * * *